(12) United States Patent
Nowoczynski et al.

(10) Patent No.: US 9,213,489 B1
(45) Date of Patent: Dec. 15, 2015

(54) DATA STORAGE ARCHITECTURE AND SYSTEM FOR HIGH PERFORMANCE COMPUTING INCORPORATING A DISTRIBUTED HASH TABLE AND USING A HASH ON METADATA OF DATA ITEMS TO OBTAIN STORAGE LOCATIONS

(71) Applicant: DataDirect Networks, Inc., Chatsworth, CA (US)

(72) Inventors: Paul Nowoczynski, Brooklyn, NY (US); Jason Micah Cope, Columbia, MD (US); Gordon Manning, Ellicott City, MD (US); Don Molaro, Cupertino, CA (US); Michael Piszczek, Laurel, MD (US); Pavan Uppu, Laurel, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 0 days.

(21) Appl. No.: 14/842,577

(22) Filed: Sep. 1, 2015

Related U.S. Application Data

(63) Continuation of application No. 14/028,292, filed on Sep. 16, 2013, now Pat. No. 9,128,826.

(60) Provisional application No. 61/715,243, filed on Oct. 17, 2012.

(51) Int. Cl.
*G06F 3/00* (2006.01)
*G06F 3/06* (2006.01)
*G06F 13/42* (2006.01)

(52) U.S. Cl.
CPC .............. *G06F 3/061* (2013.01); *G06F 3/0655* (2013.01); *G06F 3/0688* (2013.01); *G06F 13/4282* (2013.01)

(58) Field of Classification Search
CPC ..... G06F 3/006; G06F 3/0688; G06F 3/0655; G06F 13/4282
USPC ....................................... 710/62, 64; 711/103
See application file for complete search history.

(56) References Cited

U.S. PATENT DOCUMENTS 8,037,349 B2 * 10/2011 Mandagere ......... G06F 11/1435 714/6.2
9,128,826 B2 * 9/2015 Nowoczynski ..... G06F 12/0246

(Continued)

OTHER PUBLICATIONS

Sun Microsystems, Inc., Lustre File System, High-Performance Storage Architecture and Scalable Cluster File System, White Paper, Published in Dec. of 2007, http://www.raidinc.com/assets/documents/lustrefilesystem_wp. pdf, last accessed on Oct. 8, 2013; 20 total pages.*

(Continued)

*Primary Examiner* — Tammara Peyton
(74) *Attorney, Agent, or Firm* — SoCal IP Law Group LLP; Mark A. Goldstein

(57) ABSTRACT

Data storage systems and methods for storing data are described herein. The storage system may be integrated with or coupled with a compute cluster or super computer having multiple computing nodes. A plurality of nonvolatile memory units may be included with computing nodes, coupled with computing nodes or coupled with input/output nodes. The input/output nodes may be included with the compute cluster or super computer, or coupled thereto. The nonvolatile memory units store data items provided by the computing nodes, and the input/output nodes maintain where the data items are stored in the nonvolatile memory units via a hash table distributed among the input/output nodes. The use of a distributed hash table allows for quick access to data items stored in the nonvolatile memory units even as the computing nodes are writing large amounts of data to the storage system quickly in bursts.

19 Claims, 6 Drawing Sheets

(56) References Cited

U.S. PATENT DOCUMENTS

2004/0215920 A1* 10/2004 Haas .................. G06F 17/30067 711/216
2012/0185437 A1* 7/2012 Pavlov .............. G06F 17/30094 707/652

OTHER PUBLICATIONS

Philip Schwan et al., Lustre: Building a File System for 1,000-node Clusters, Proceedings of the Linux Symposium, Jul. 23, 2003; pp. 401-408.*
Feiyi Wang et al., Understanding Lustre Filesystem Internals, National Center for Computational Sciences, prepared by Oak Ridge National Laboratory, Managed by UT-Battelle for the Department of Energy, published Apr. 2009; 80 total pages.*
Brent Welch et al., Scalable Performance of the Panasas Parallel File System, Panasas White Paper, published in the proceedings of the 6th USENIX Conference on File and Storage Technologies (FAST '08), Feb. 26, 2008; 22 total pages.*
Panasas, Panasas ActiveStor 11 & 12, Parallel Scale-out NAS Appliance for HPC Workloads, article published Sep. 10, 2012.*
John Bent et al., PLFS: A Checkpoint Filesystem for Parallel Applications, article, published in 2009, http://www.pdl.cmu.edu/PDL-FTP/PDSI/plfs.pdf, last accessed Oct. 8, 2013; 12 total pages.*
Paul Nowoczynski et al., Zest Checkpoint Storage System for Large Supercomputers, article, Pittsburgh Supercomputing Center, 3rd Petascale Data Storage Institute, Nov. 17, 2008; 5 total pages.*

* cited by examiner

DATA STORAGE ARCHITECTURE AND SYSTEM FOR HIGH PERFORMANCE COMPUTING INCORPORATING A DISTRIBUTED HASH TABLE AND USING A HASH ON METADATA OF DATA ITEMS TO OBTAIN STORAGE LOCATIONS

RELATED APPLICATION INFORMATION

This patent is a continuation of patent application Ser. No. 14/028,292 filed Sep. 16, 2013, now U.S. Pat. No. 9,128,826 issued Sep. 8, 2015 entitled DATA STORAGE ARCHITECTURE AND SYSTEM FOR HIGH PERFORMANCE COMPUTING INCORPORATING A DISTRIBUTED HASH TABLE AND USING A HASH ON METADATA OF DATA ITEMS TO OBTAIN STORAGE LOCATIONS, which claims priority from provisional patent application No. 61/715,243 filed Oct. 17, 2012, both of which are incorporated by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and an improved architecture and method for storing data to and retrieving data from a data storage system particularly in a high speed super computing environment.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, images, audio, videos and other data as objects using a distributed data storage system in which data is stored in multiple locations.

Parallel log-structured file system techniques were introduced in the Zest checkpointing file system and the Parallel Log-Structured File system (PLFS). Both Zest and PLFS allow clients to operate in a fully autonomous fashion not subject to coherency management mechanisms. Other parallel file systems such as PanFS® (available from Panasas, Inc.), Lustre® (available from the Cluster File Systems, Inc.), and GPFS (the General Parallel File System available from IBM Corp.) use page based schemes which require network level update atomicity. In these file systems, clients acquire a lock before updating a file or portion thereof, otherwise, the system risks corrupting files when two or more clients attempt to update the same page simultaneously. Zest and PLFS provide internal structures which allow for the indexing of file extents at single byte granularity.

When large amounts of data are created quickly, Zest and PLFS have significant deficiencies when a data item must be accessed. In a Zest system, data may only be obtained from primary storage, typically a hard disk drive. Faster, buffer volatile memory may not be accessed to obtain requested data. In Zest, the system incurs delays while waiting for data to be written to primary before being accessed. In PLFS, data stored in buffer memory may be accessed, but it is indexed linearly such that significant time delays are incurred in identifying the location of data to be read from a buffer in PLFS systems.

Another file system, PanFS®, the parallel file system product from Panasas, Inc., institutes a network RAID scheme that builds fault tolerant groups from aligned contiguous file regions. This approach suffers from serialization in that only one client may modify a given region at any one time. Further, this scheme is susceptible to a large degree of read-modify-writes which causes performance degradation.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Environment

Super computers store a large quantity of data quickly. It is advantageous to store and make the data available as quickly as possible. To improve super computer throughput blocking or waiting for data to be stored should be reduced as much as possible. Storing data in a tiered system in which data is initially stored in an intermediate storage consisting of Non-Volatile Memory (NVM) and then later written to primary storage such as hard disk drives using the architectures described herein help achieve increased supercomputer throughput. In this way, the NVM serves as a burst buffer. As used herein NVM refers to solid state drives aka silicon storage devices (SSDs), flash memory, NAND-based flash memory, phase change memory, spin torque memory, and other non-volatile storage that may be accessed quickly compared to primary storage such as hard disk drives. The speed to access NVM is typically an order of magnitude faster than accessing primary storage.

According to the methods described herein, when the computing nodes of a super computer or compute cluster create large amounts of data very quickly, the data is initially stored in NVM, which may be considered a burst buffer or intermediate storage, before the data is stored in primary storage. This may be achieved in multiple hardware configurations, three of which are shown and described regarding FIGS. 1, 2 and 3.

The hardware configurations combined with the method described allow for increased computing throughput and efficiencies as the computing nodes do not need to wait or block when storing or retrieving data.

Figure 1:
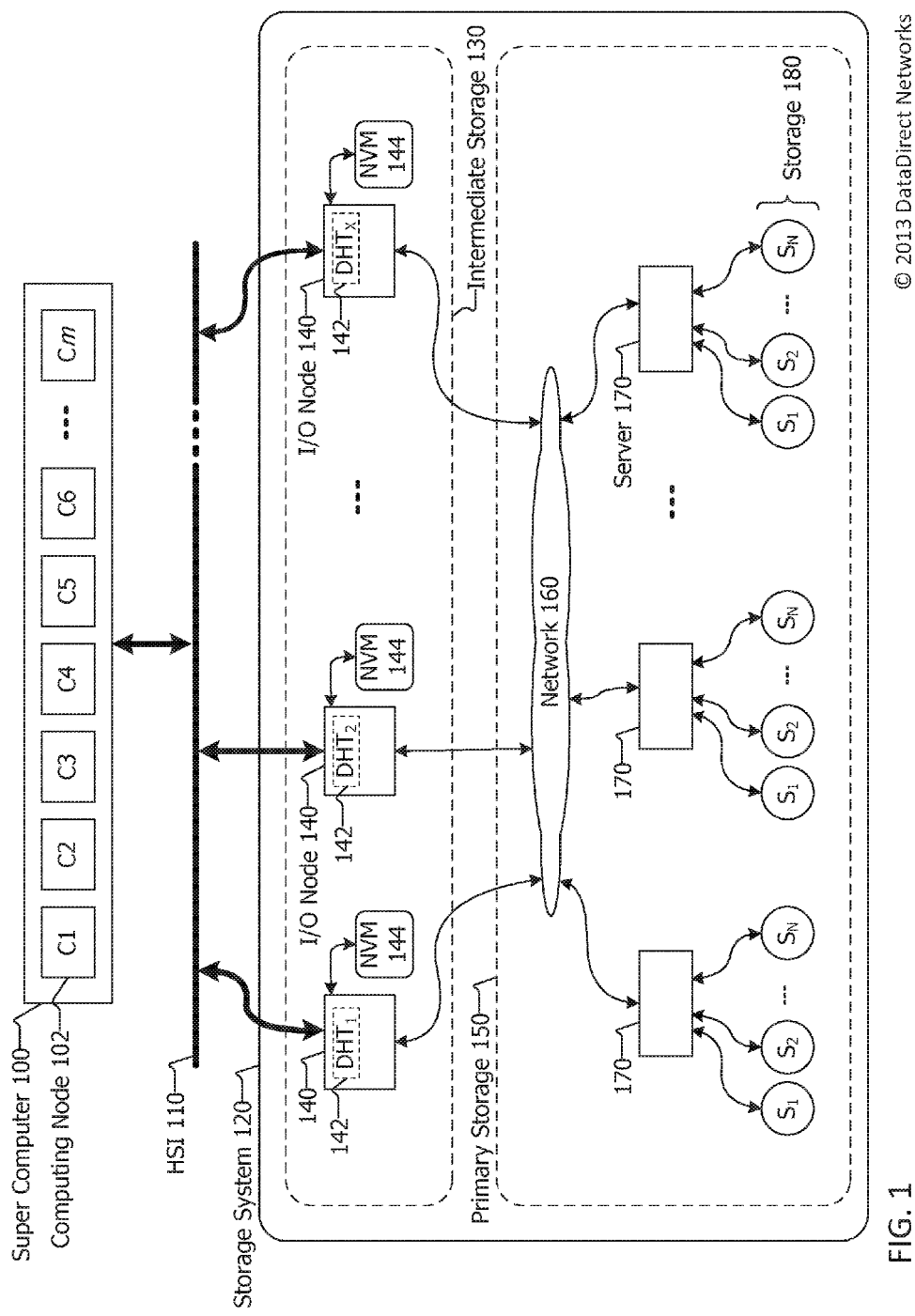
FIG. 1 is a block diagram of a first embodiment of a data storage system coupled with a super computing system.

FIG. 1 is a block diagram of a first embodiment of a data storage system 120 coupled with a super computer 100. The super computer 100 may be a compute cluster that includes a plurality of computing nodes 102. Similarly, the compute cluster may be a super computer. Each computing node has at least one core and may have multiple cores, such as 2, 4, 8, 32, etc. The computing nodes may be in one or more racks, shelves or cabinets, or combinations thereof. The super computer 100 is coupled via a High Speed Interconnect (HSI) 110 to the data storage system 120. The HSI 110 may conform to the INFINIBAND, CASCADE, GEMINI architecture or standard and their progeny, may be an optical fiber technology, may be proprietary, and the like. The data storage system 120 includes intermediate storage 130 and primary storage 150. The intermediate storage 130 includes a plurality of servers referred to as I/O node 140, each I/O node having a portion of a Distributed Hash Table (DHT) 142 included therein, and having NVM 144 coupled thereto. $DHT_1$, $DHT_2$ through $DHT_X$ 142 are portions of the DHT maintained by the I/O nodes 140 of the storage system 120. The DHT 142 is primarily used to maintain location information for stored data items, also referred to as Unstructured Layout Metadata (ULM) for data items stored by the computing nodes 102 of the super computer in the data storage system 120. The DHT 142 may also store parity group information (PGI), data item (or file) attributes, file replay state, and other information about the stored data item.

The DHT and constituent portions 142 may be indexed by and accessed according to the hash of metadata for stored data items. The use of a DHT allows for quick access to data items stored in the NVM 144 even as the computing nodes are writing large amounts of data to the storage system quickly in bursts. As used herein, metadata is information associated with data that describes attributes of the data. Metadata may be associated with data at the time of initial storage in intermediate storage 130. For each data item, the hash may be based on some commonly known or inferred parameters for the data item, such as for example data item identifier, an offset for the data item, a size of the data item, a timestamp of when the file was created, and others. To locate a file in the data storage system, a data item or file identifier (FID), offset, and server rank (0 for the primary maintainer, other number 1 through n for subjugate maintainers) are provided to a hash function. The hash function outputs the corresponding index or identifier of a hash table entry that contains the address of an NVM location managed by a particular I/O node 140. The hash function is written so that data is evenly distributed among the NVM units. Other DHT actions such as FID attribute lookup and parity group information (PGI) lookup require only two parameters: the server rank and the FID or PGID. Both the I/O nodes 140 and the computing nodes 102 execute the same hash function.

The I/O nodes 140 manage the distribution of data items from the super computer 100 so that data items are spread evenly across the NVM 144 in the I/O nodes 140.

Each of the I/O nodes 140 in the intermediate storage 130 is coupled with the HSI 110. Each of the I/O nodes 140 in the intermediate storage 130 is coupled with the primary storage 150 via a network 160. The network 160 is shown included in the primary storage 150, but may span both the intermediate storage 130 and primary storage 150 or be included between them.

The primary storage 150 typically includes multiple storage servers 170 that are independent of one another. The storage servers 170 may be in a peer-to-peer configuration. The storage servers may be geographically dispersed. The storage servers 170 and associated storage devices 180 may replicate data included in other storage servers.

The storage servers 170 may be separated geographically, may be in the same location, may be in separate racks, may be in separate buildings on a shared site, may be on separate floors of the same building, and arranged in other configurations. The storage servers 170 communicate with each other and share data over network 160. The network 160 may be a local area network, a wide area network, or a combination of these. The network 160 may be wired, wireless, or a combination of these. The network 160 may include wire lines, optical fiber cables, wireless communication connections, and others, and may be a combination of these and may be or include the Internet. The network 160 may be public or private, may be a segregated network, and may be a combination of these. The network 160 includes networking devices such as routers, hubs, switches and the like.

The servers 170 may augment or enhance the capabilities and functionality of the data storage system by promulgating policies, tuning and maintaining the system, and performing other actions.

The term data as used herein includes multiple bits, multiple bytes, multiple words, a block, a stripe, a file, a file segment, or other grouping of information. In one embodiment the data is stored within and by the data storage system as objects. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

The I/O nodes 140 and servers 170 are computing devices that include software that performs some of the actions described herein. The I/O nodes 140 and servers 170 may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the servers may include various specialized units, circuits, software and interfaces for providing the functionality and features described herein. The processes, functionality and features described herein may be embodied in whole or in part in software which operates on a controller and/or one or more I/O nodes 140 and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or server, and others by other controllers or servers in the data storage system 120.

A computing device as used herein refers to any device with a processor, memory and a storage device that may execute instructions such as software including, but not limited to, server computers. The computing devices may run an operating system, including, for example, versions of the Linux, Unix, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND network, Fibre Channel, and others. A computing device with a network interface is considered network capable.

Referring again to FIG. 1, each of the storage devices 180 include a storage medium or may be an independent network attached storage (NAS) device or system. The term "storage media" is used herein to refer to any configuration of hard disk drives (HDDs), solid-state drives (SSDs), silicon storage devices, magnetic tape, or other similar storage media. Hard disk drives, solid-states drives and/or other storage media 180 may be arranged according to any of a variety of techniques.

The storage devices 180 may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example server 170 may include 16 three terabyte 3.5" hard disk drives conforming to the SATA standard. In other configurations, there may be more or fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in primary storage 150.

The storage devices 180 may be included in a single cabinet, rack, shelf or blade. When the storage devices 180 in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage devices according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

The rack, shelf or cabinet containing a storage zone may include a communications interface that allows for connection to other storage zones, a computing device and/or to a network. The rack, shelf or cabinet containing storage devices 180 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing storage devices may include a network interface chip, chipset, card or device that allows for communication over a wired and/or wireless network, including Ethernet, namely network 160. The controller and/or the backplane may provide for and support 1, 2, 4, 8, 12, 16, etc. network connections and may have an equal number of network interfaces to achieve this.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks and tape, flash memory, and optical disks such as CDs, DVDs and BLU-RAY® discs.

In some embodiments, files and other data may be partitioned into smaller portions and stored as multiple objects among multiple storage devices 180 associated with a storage server 170. Files and other data may be partitioned into portions referred to as objects and stored among multiple storage devices. The data may be stored among storage devices according to the storage policy specified by a storage policy identifier. Various policies may be maintained and distributed or known to the servers 170 in the primary storage 150.

As used herein, policies define the replication and placement of data objects in the data storage system. Example replication and placement policies include, full distribution, single copy, single copy to a specific storage device, copy to storage devices under multiple servers, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies.

The primary storage system 150 may provide for one or multiple kinds of storage replication and data resiliency. The data storage systems described herein may operate as a fully replicated distributed data storage system in which all data is replicated such that all copies of stored data are available from and accessible. This is referred to herein as a fully replicated storage system. Replication may be performed synchronously, that is, completed before the write operation is acknowledged; asynchronously, that is, the replicas may be written before, after or during the write of the first copy; or a combination of each. This configuration provides for a high level of data resiliency.

Another configuration of primary storage 150 provides for partial replication such that data may be replicated in one or more locations in addition to an initial location to provide a limited amount of redundancy such that access to data is possible when a location goes down or is impaired or unreachable, without the need for full replication. Another configuration of primary storage 150 is when no replication exists such that data is stored solely in one location. However, resiliency may be provided by using various techniques such as by a RAID or other configuration.

Figure 2:
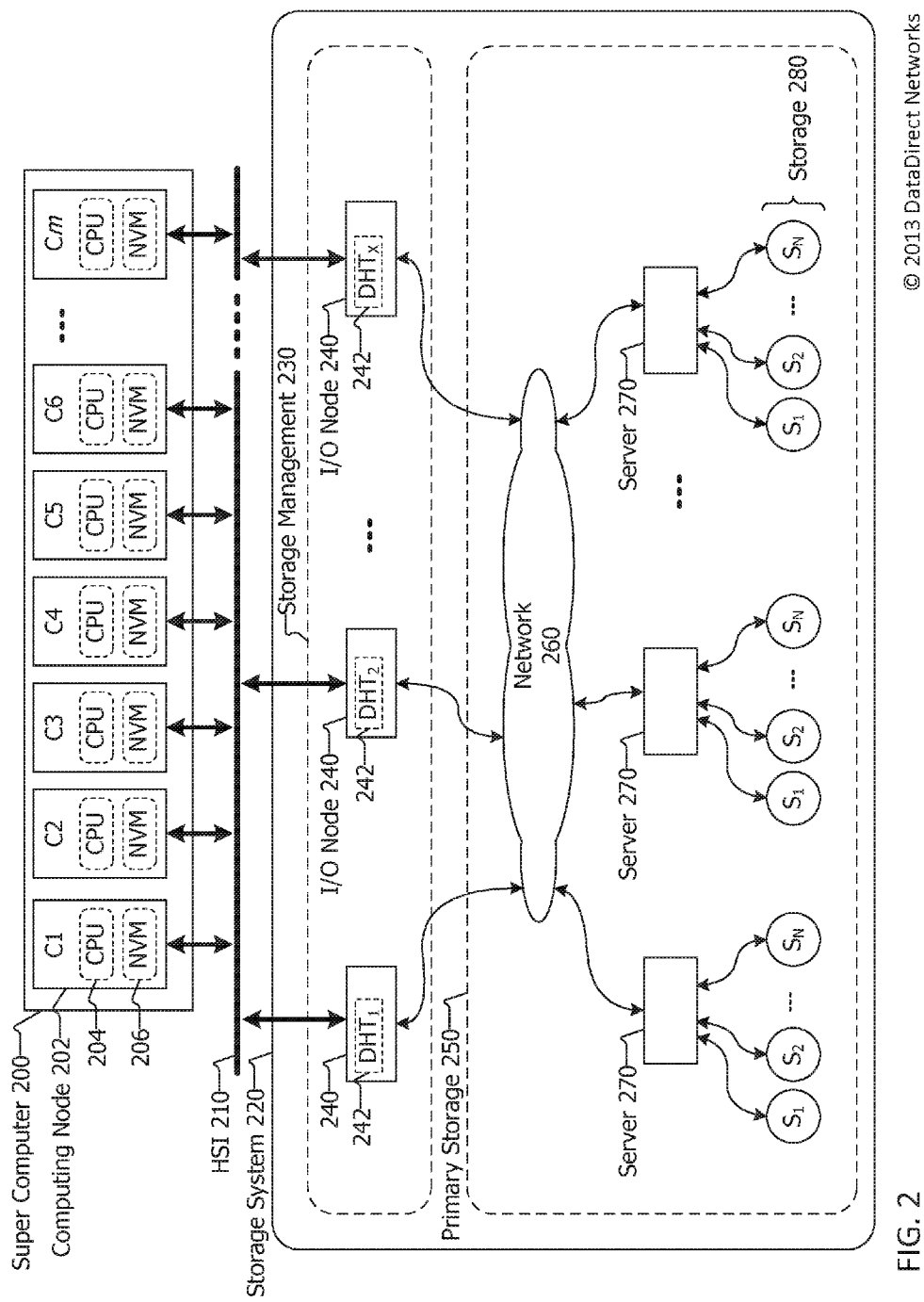
FIG. 2 is a block diagram of a second embodiment of a data storage system coupled with a super computing system.

FIG. 2 is a block diagram of a second embodiment of a data storage system coupled with a super computing system. In this embodiment, super computer 200 includes multiple computing nodes 202. Similarly, a group of computing nodes may form a compute cluster and the compute cluster may be a super computer. Each computing node includes a CPU 204 and its own NVM 206. The CPU may be single core have multiple cores. An advantage of this configuration is that the NVM is included in the computing nodes 202 to increase speed of access to the NVM 206 by the CPU 206 in the same computing node 202. In this configuration, the use of NVM, regardless of its location, is unbounded such that data from any of the CPUs may be stored to the NVM of another computing node. When data is to be written by a CPU in one computing node to the NVM of another computing node, the appropriate I/O node must be updated or notified about the computing node writing to the NVM of another computing node. This is because the I/O nodes 240 maintain a DHT 242 providing the address of all data stored in the NVM 206. The use of the DHT allows for quick access to data items stored in the NVM 206 even as the computing nodes are writing large amounts of data to the NVM quickly in bursts. An increase in performance results from the computing nodes being able to access the NVM 206 directly rather than through an I/O node as is done in the configuration of FIG. 1; this results in increased data throughput to (and from) the NVM. However, because data is spread among the NVM units, there is some overhead in processing and management when data from one computing node is written to the NVM of another computing node.

Other than moving the NVM from the data storage system into the super computer 200, the data storage system 220 is in most other aspects the same as data storage system 120 from FIG. 1 described above. The super computer is coupled to a data storage system 220 via a high speed interconnect 210. I/O nodes 240 include DHTs 242 and serve as storage management 230 of data items from the super computer according to the methods described herein. The I/O nodes 240 of storage management 230 are coupled with the primary storage 250 via network 260. The servers 270 included in primary storage have multiple storage devices 280 for use as primary storage 250 of data items from the super computer 200. The I/O nodes 240 of storage management 230 use portions of the DHT to manage the data items stored by the computing nodes 202 of super computer 200.

Figure 3:
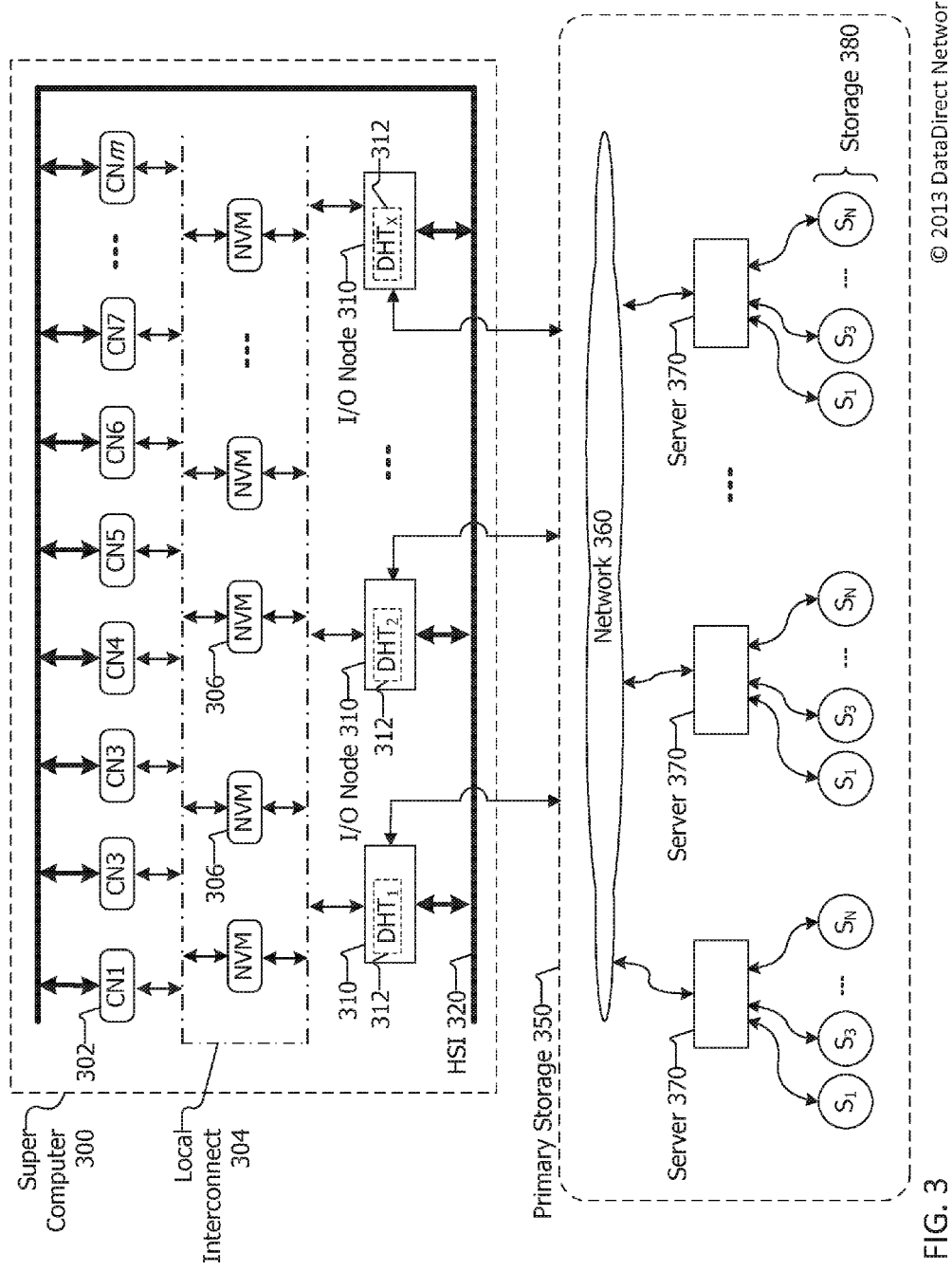
FIG. 3 is a block diagram of a third embodiment of a data storage system coupled with a super computing system.

FIG. 3 is a block diagram of a third embodiment of a data storage system coupled with a super computing system. In this embodiment, the I/O nodes 310 are included in the super computer 300 or within or closely coupled with a compute cluster of computing nodes. This contrasts the other embodiments shown in FIGS. 1 and 2 in which the I/O nodes are included in a storage system coupled with the super computer. Further, the NVM 306 is included in the super computer 300 and is accessible to both computing nodes 302 and the I/O nodes 310 via a local interconnect 304. The local interconnect 304 may conform to the serial attached storage (SAS) standard, the peripheral component interconnect express or PCI Express standard, may implement a DRAM-like protocol or other data communication standard or technology. This configuration allows computing nodes 302 to access any available NVM 306. The use of the DHT 312 in the I/O nodes 310 allows for quick access to data items stored in the NVM 306 even as the computing nodes 302 are writing large amounts of data to the NVM quickly in bursts. A better more efficient use of NVM results causing increased throughput or processing. The configuration shown in FIG. 3 removes the problem of having NVM tied to particular computing nodes as shown in the configuration of FIG. 2. In this way, the table look up required of the configuration shown in FIG. 1 is removed.

In the configuration of FIG. 3, for a computing node 302 to write to NVM 306, the computing node 302 requests permission to write data from the I/O node 310, and the I/O node 310 receives the request and allocates a portion of NVM in one of the NVM units 306 in response to the request.

As shown in FIG. 3, the super computer 300 includes computing nodes 302 coupled with both the HSI 320 and the local interconnect 304. The computing nodes 302 include one or more CPUs which include one or more processor cores. The computing nodes 302 access NVM 306 via local interconnect 304. As with the other configurations shown in FIGS. 1 and 2, the I/O nodes 310 include a DHT 312 portions of which are distributed among the I/O nodes 310. The I/O nodes 310 that manage data storage are included in the super computer 300 and coupled with both the HSI 320 and the local interconnect 304. In this way the I/O nodes 310 can directly access the NVM 306 and communicate over the fast HSI connection 320 with the computing nodes 302.

The primary storage 350 is for the most part the same at the primary storage described above regarding FIG. 1, in which servers 370 have multiple storage devices 380 coupled thereto for storing data items received from the computing nodes 302 of the super computer 300. The servers 370 are coupled with one another via network 360 and are coupled with I/O nodes 310 via the network 360.

Processes

When the computing nodes are providing data at a very high speed, the data produced by the computing nodes intended to be stored at NVM associated with a particular I/O node may end up being stored in NVM associated with another I/O node due to processing backlog or activity at an I/O node and/or its associated NVM. The data is stored as unstructured data which may be objects, files, file fragments, file segments, etc.

Figure 4:
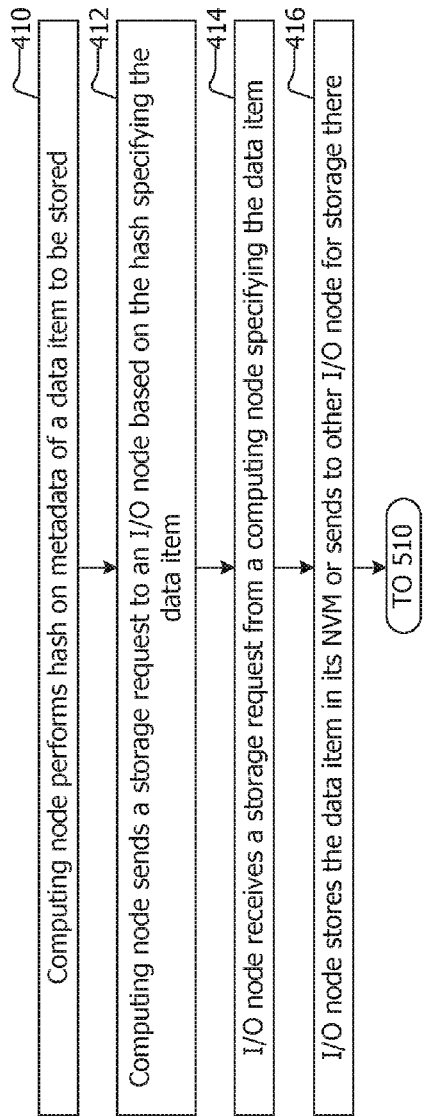
FIG. 4 is a flow chart of preliminary actions taken to store or put data in a data storage system.

FIG. 4 is a flow chart of preliminary actions taken to store or put data in a data storage system according to the hardware configuration described in FIG. 1. According to FIG. 4 with reference to FIG. 1, a computing node 102 performs a hash on metadata of a data item to be stored, as shown in block 410. The computing node sends a storage request to an I/O node 140 based on the hash specifying the data item, as shown in block 412. The I/O node 140 receives a storage request from a computing node 102 specifying the data item, as shown in block 414. The I/O node 140 stores the data item in its NVM or sends it to another I/O node for storage there, as shown in block 416. This may be because the I/O node and/or the NVM are processing other storage requests or in the unlikely event the NVM is full. The flow of actions then continues with block 510 of FIG. 5. Other preliminary and basic write or put actions are described above concerning each of the other two hardware configurations.

Figure 5:
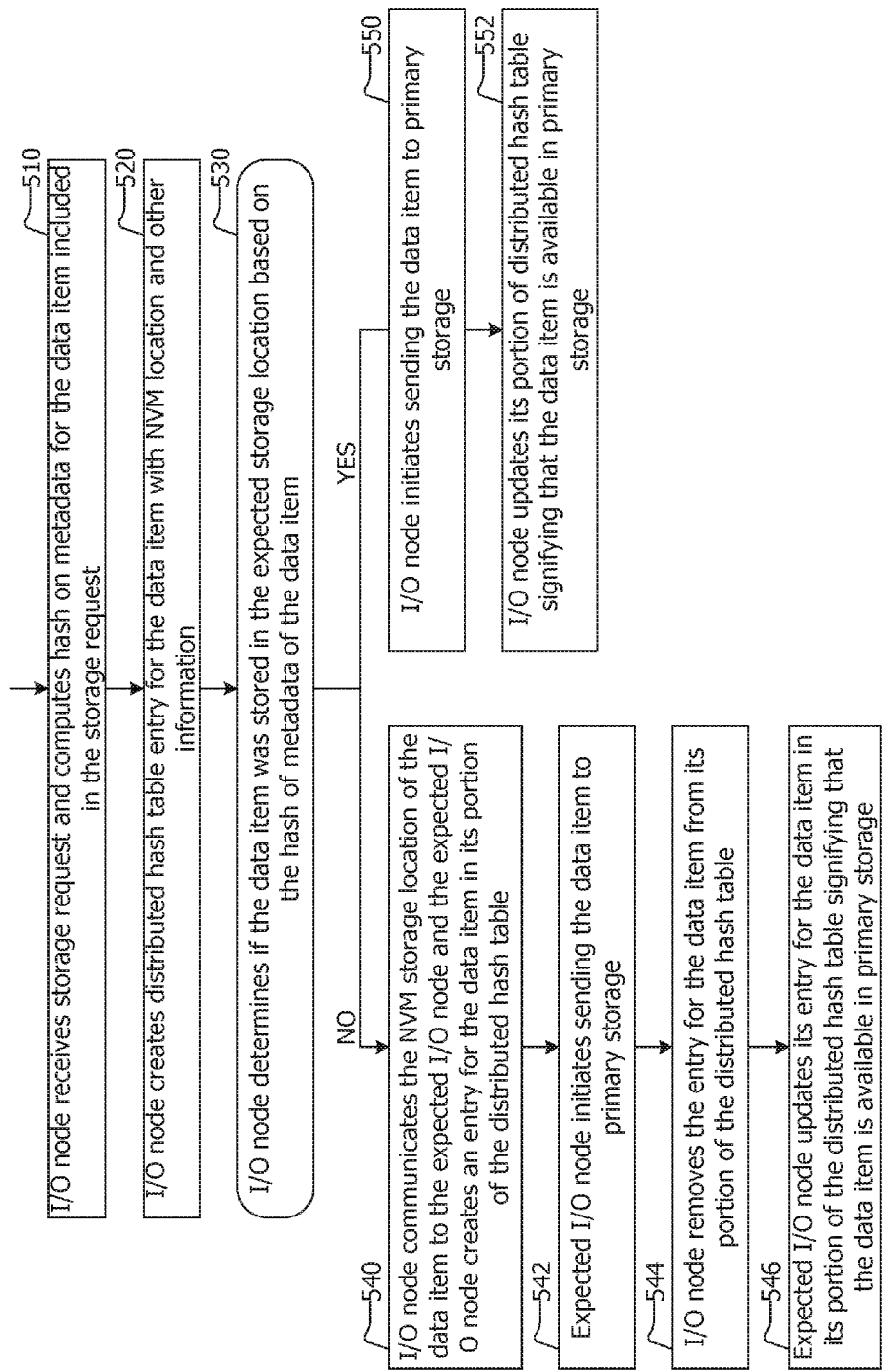
FIG. 5 is a flow chart of actions taken to store or put data in a data storage system.

FIG. 5 is a flow chart of actions taken to store or put data in a data storage system. The actions may be taken with any of the hardware configurations of data storage systems described above regarding FIGS. 1, 2 and 3. When there is a surge of data to be stored by computing nodes, data will be distributed among the NVM units. However, the data may not always be stored in the expected NVM unit. The method describe herein provides a way of keeping track of where the data items are so they may be accessed, whether in NVM or primary storage.

The I/O node receives a storage request and computes a hash on metadata for the data item included in the storage request, as shown in block 510. The I/O node creates a distributed hash table entry for the data item with NVM location and other information, as shown in block 520. The I/O node determines if it was the expected storage location of the data item based on the hash of metadata of the data item, as shown in block 530.

If the I/O node was not the expected storage location, the I/O node communicates the NVM storage location of the data item to the expected I/O node and the expected I/O node creates an entry for the data item in its portion of the distributed hash table, as shown in block 540. The expected I/O node then initiates sending the data item to primary storage, as shown in block 542. The writing of the data item to primary storage may be achieved using a call in a format required by the particular primary storage system. However, the primary storage is configured to identify the data item by the FID created using the hash methodology described. That is, data in the primary storage is accessed by using the same FID resulting from the hash function used by the computing nodes and the I/O nodes.

Continuing the flow of actions when the I/O node was not the expected storage location, the I/O node removes the entry for the data item from its portion of the distributed hash table, as shown in block 544. The expected I/O node then updates its entry for the data item in its portion of the distributed hash table signifying that the data item has been moved to primary storage, as shown in block 546. This may be done by removing an entry for the hash of the metadata for the data item such that there is no entry, or replacing the NVM address with a flag or other unique or special identifier. In this way, when a computing node requests a copy of the data item, the proper I/O node has information in its portion of the DHT signifying that the data item is available in primary storage.

If the I/O node was the expected storage location, the I/O node initiates sending the data item to primary storage, as shown in block 550. The I/O node then updates its portion of the distributed hash table signifying that the data item has been moved to primary storage, as shown in block 552. This may be done by removing an entry for the hash of the metadata for the data item such that there is no entry, or by replacing the address with a flag or other unique or special identifier.

Figure 6:
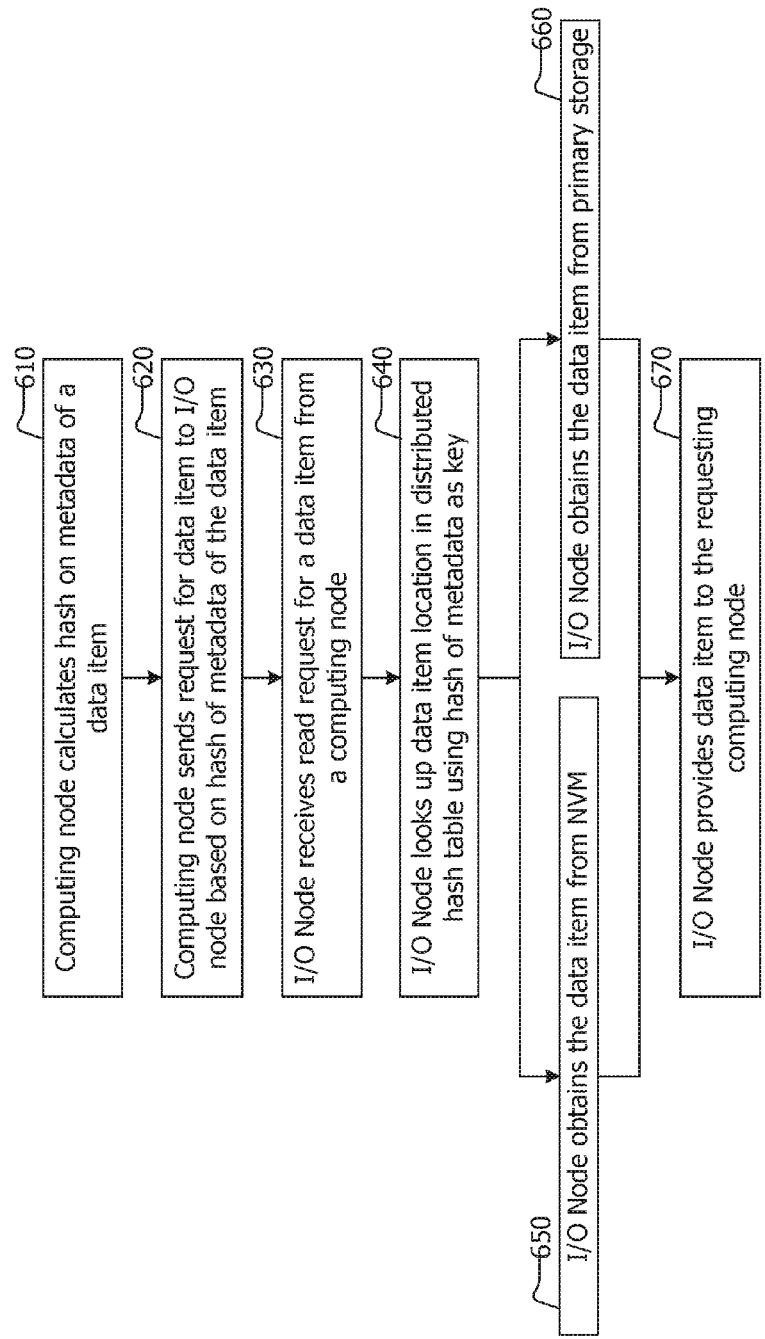
FIG. 6 is a flow chart of the actions taken to read or get data in a data storage system.

FIG. 6 is a flow chart of the actions taken to read or get data in a data storage system, also referred to as data retrieval. When a computing node of a super computer or compute cluster requests a data item from one of the storage systems described regarding and shown in FIGS. 1, 2 and 3, the I/O node takes the actions recited and shown in FIG. 6. A computing node calculates a hash on metadata for a data item as shown in block 610. The computing node sends a request for the data item to an I/O node based on the hash of metadata for the data item, as shown in block 620. The I/O node receives a read request for a data item from a super computer computing node, as shown in block 630. The I/O node looks up the data item location in its portion of the distributed hash table using the hash of the metadata as key, as shown in block 640. The entry in the hash table will either have the address in NVM of the data item, an address of another I/O node which manages the data item, or no entry when the data item has been moved to primary storage. In another embodiment a flag or other identifier signifying to the I/O node that the data item is located in primary storage may be included as the entry for the hash of the metadata for the data item in the DHT. The I/O node then either obtains the data from NVM if the data item is still present in NVM associated with or coupled with the I/O node, as shown in block 650, or the I/O node obtains the requested data item from primary storage, as shown in block 660. If in NVM, depending on the hardware configuration used and the circumstances, the I/O node may provide the data from its own NVM or group of NVM under its control and management, or it may forward the request to another I/O node when the data item resides in the other I/O node's NVM or NVM under its control and management. If in primary storage, the I/O node obtains the data item from the primary storage by reformatting or repackaging the read request according to the requirements of the primary storage, and forwarding the reformatted or repackaged read request to the primary storage. When obtaining the data item from primary storage, the I/O node will receive the requested data item (or a pointer thereto) in a primary storage response to the reformatted/repackaged read request. The I/O node then provides the requested data item (or a pointer thereto) to the requesting computing node, as shown in block 670.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A compute cluster comprising:
   a plurality of computing nodes each coupled with a high speed interconnect and with a local interconnect, wherein the high speed interconnect conforms to one of the INFINIBAND, OMNI-PATH, CASCADE or GEMINI architectures, and wherein the local interconnect conforms to one of a serial attached storage (SAS) standard, a peripheral component interconnect express (PCI Express) standard, or a DRAM-like protocol;
   a plurality of nonvolatile memory units coupled with the local interconnect and accessible to the computing nodes via the local interconnect, wherein the nonvolatile memory units comprise at least one selected from the group including solid state drives (SSDs), flash memory, NAND-based flash memory, phase change memory, and spin torque memory;
   a plurality of input/output nodes coupled with the high speed interconnect, each input/output node including a portion of a distributed hash table to maintain a data item location of data items provided by the computing nodes, the distributed hash table indexed according to a hash on metadata for the data items, wherein each input/output node is a server computer.

2. The compute cluster of claim 1 wherein a number of computing nodes exceeds a number of nonvolatile memory units.

3. The compute cluster of claim 1 wherein a number of nonvolatile memory units exceeds a number of input/output nodes.

4. The compute cluster of claim 1 wherein each computing node has multiple cores.

5. The compute cluster of claim 1 wherein the metadata includes a data item identifier and an offset for the data item.

6. The compute cluster of claim 1 wherein each entry in the distributed hash table includes either an address in one of the nonvolatile memory units where the data item is stored or an indication the data item is stored in a primary storage.

7. The compute cluster of claim 1 further comprising:
a primary storage including a plurality of storage servers, wherein the input/output nodes are coupled with the primary storage via a network.

8. The compute cluster of claim 1 wherein the high speed interconnect comprises an optical fiber technology.

9. The compute cluster of claim 1 wherein the compute cluster is a super computer.

10. A compute cluster comprising:
a plurality of computing nodes each coupled with a high speed interconnect and with a local interconnect, wherein the high speed interconnect conforms to one of the INFINIBAND, OMNI-PATH, CASCADE or GEMINI architectures;
a plurality of nonvolatile memory units coupled with the local interconnect to serve as a burst buffer to receive large amounts of data at high speed from the computing nodes;
a plurality of input/output nodes coupled with the high speed interconnect, wherein each input/output node is a server computer;
a distributed hash table stored in portions among the input/output nodes to maintain a data item location of data items provided by the computing nodes, the distributed hash table indexed according to a hash on metadata for the data items, wherein each entry in the distributed hash table includes either an address in one of the nonvolatile memory units where the data item is stored or an indication the data item is stored in a primary storage.

11. The compute cluster of claim 10 wherein the high speed interconnect includes an optical fiber technology.

12. The compute cluster of claim 10 wherein the local interconnect conforms to one of a serial attached storage (SAS) standard, a peripheral component interconnect express (PCI Express) standard, or a DRAM-like protocol.

13. The compute cluster of claim 10 wherein the nonvolatile memory units comprise at least one selected from the group including solid state drives aka silicon storage devices (SSDs), flash memory, NAND-based flash memory, phase change memory, and spin torque memory.

14. The compute cluster of claim 10 wherein a number of computing nodes exceeds a number of nonvolatile memory units.

15. The compute cluster of claim 10 wherein a number of nonvolatile memory units exceeds a number of input/output nodes.

16. The compute cluster of claim 10 wherein each computing node has multiple cores.

17. The compute cluster of claim 10 wherein the metadata includes a data item identifier and an offset for the data item.

18. The compute cluster of claim 10 further comprising:
a primary storage including a plurality of storage servers, wherein the input/output nodes are coupled with the primary storage via a network.

19. The compute cluster of claim 10 wherein the compute cluster is a super computer.

* * * * *